United States Patent [19]

Webel

[11] Patent Number: 4,945,669
[45] Date of Patent: Aug. 7, 1990

[54] JIG FISHING LURE WITH CONTROLLED RATE OF DESCENT

[76] Inventor: Kenneth G. Webel, 8712 E. 46th St., Tulsa, Okla. 74145

[21] Appl. No.: 147,760

[22] Filed: Jan. 25, 1988

[51] Int. Cl.$^5$ .............................................. A01K 85/00
[52] U.S. Cl. ................................................... 43/42.39
[58] Field of Search ........................................ 43/42.39

[56] References Cited

U.S. PATENT DOCUMENTS

| | | | |
|---|---|---|---|
| 2,575,797 | 11/1951 | Corsi | 43/42.39 |
| 2,596,457 | 5/1952 | Wulff | 43/42.53 |
| 2,817,922 | 12/1957 | Takeshita | 43/42.39 |
| 3,367,060 | 2/1968 | Abercrombie | 43/42.33 |
| 3,483,651 | 12/1969 | Borger | 43/42.39 |
| 3,514,358 | 5/1970 | Monaghan et al. | 156/306 |
| 3,611,614 | 10/1971 | Ward | 43/42.39 |
| 3,729,850 | 5/1973 | Waters | 43/42.39 |
| 3,868,784 | 3/1975 | Sabol | 43/42.39 |
| 3,909,974 | 10/1975 | Kent | 43/42.39 |
| 3,942,281 | 3/1976 | Hill | 43/42.39 |
| 3,959,060 | 5/1976 | Jones | 156/245 |
| 4,015,363 | 4/1977 | Sedlak | 43/42.22 |
| 4,037,346 | 7/1977 | Holst | 43/42.14 |
| 4,215,506 | 8/1980 | LeBoeuf | 43/42.05 |
| 4,464,857 | 8/1984 | Olszewski | 43/42.33 |
| 4,530,179 | 7/1985 | Larew | 43/42.06 |
| 4,738,047 | 4/1988 | Ryan | 43/42.39 |

Primary Examiner—Kurt Rowan

[57] ABSTRACT

A jig fishing lure characterized by a controlled rate of descent in water comprising: a barbed fishing hook with a molded plastic head (e.g., polyethylene, polypropylene and/or copolyester) with an internal metal core (e.g., lead) and trailing skirt. By selecting the relative amounts of plastic and metal core used in the head of the jig, the overall fall rate of the lure in water can be controlled from about 2 feet per second to about 1 foot per 3.25 seconds. Knowing the controlled fall rate, the fisherman can select and control the depth of the jigging action during fishing.

12 Claims, 1 Drawing Sheet

JIG FISHING LURE WITH CONTROLLED RATE OF DESCENT

BACKGROUND OF THE INVENTION

1. Field of the Invention:

This invention relates generally to fishing lures and specifically to a small lure for underwater use having a weighted head near the hook eyelet and a trailing skirt covering the barbed hook commonly referred to as a "jig". More specifically, the invention relates to a jig that has a controlled rate of descent (rate of fall in water).

2. Description of the Prior Art:

A contemporary jig or related fishing lure typically involves a metallic head portion molded (e.g., out of lead) around the shank portion of a barbed fishing hook immediately behind the eyelet. A trailing skirt or tail typically consisting of a bundle of individual strands of material (e.g., rubber or plastic) is fastened behind the weighted head to the shank of the hook and extends rearward such as to partially cover the barbed hook.

Several variations and modifications to the jig are also generally known and commercially available. For example, a partially weedless version can be made by adding one or more wirelike extensions directed rearward from the molded head towards the tip of the barbed hook. It is also generally known to attach spinners or the like to such extensions.

Because of their weight, jigs are intended to be used under the water rather than as a surface lure. They are generally characterized by a rather rapid rate of descent or fall in water. This in turn tends to emulate the movement of a minnow or other small fish and allows the angler to attack fish by employing a quick short jerking motion up and down as the lure is retrieved commonly referred to as "jigging". As such, the jig is generally known as an artificial lure particularly suitable and effective for attracting and catching game fish, such as bass, crappies, perch, sunfish, walleye, trout and the like.

SUMMARY OF THE INVENTION

The present invention provides a small weighted jig fishing lure having a rate of fall when submerged in water that is known to the fisherman and substantially less than the fall rate associated with the lead head jig. For example, the conventional ½ ounce lead head jig will have a fall rate in water typically of the order of 4 feet per second (i.e., 1 foot per 0.25 seconds). In contrast, a nominal ½ ounce size jig according to the present invention and weighing 1/32 ounce with or without a plastic worm on the hook will typically fall at a rate of 1 foot per 3.25 seconds. Knowing the specific rate of fall in water, the fisherman can readily count the lure down to the desired depth to be fished and then control the depth of the jigging action by working the fishing pole rod tip a given distance and then allowing a corresponding time span for an equal distance of fall (e.g., for the above case, 1 foot lift followed by either about 2 or 3 seconds of fall back).

Thus, the present invention provides a jig fishing lure characterized by a controlled rate of descent in water comprising:

(a) a fishing hook having an eyelet at one end of the shank and a barbed hook at the other end;

(b) a head means molded of plastic attached to the shank directly behind the eyelet wherein the plastic molded head means contains a metal core of sufficient mass to achieve an overall rate of fall in water for the lure of from about 2 feet per second to about 1 foot per 3.25 seconds; and (c) a skirt means attached to the shank and extending towards the barbed hook.

It is an object of the present invention to provide a novel jig fishing lure that is characterized by a known rate of descent in water that is substantially slower than the conventional rate of fall of a lead head jig. It is a further object of the present invention to provide a series of such slow descending jigs that have selected and known rates of fall in water when used in combination with plastic worm or pork rind. Fulfillment of these objects and the presence and fulfillment of other objects will be apparent upon complete reading of the specification and claims taken in conjunction with the drawings.

DESCRIPTION OF THE PREFERRED EMBODIMENTS

Figure 1:
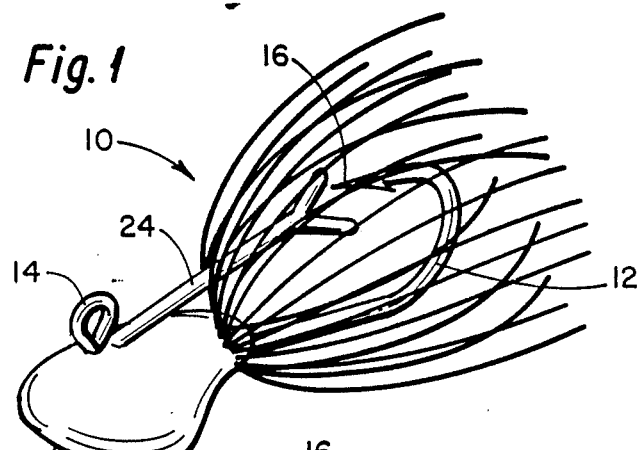
FIG. 1 is a perspective view of a fishing lure according to the present invention.
Figure 2:
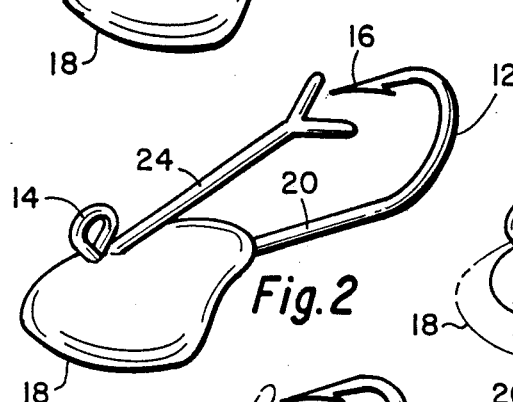
FIG. 2 is a perspective view of the fishing lure of FIG. 1 with the trailing skirt removed.
Figure 5:
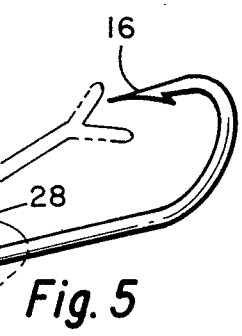
FIGS. 3 through 7 are side views of nominal ½ ounce jigs according to the present invention, without the trailing skirts, illustrating the internal lead shot used to achieve various desired rates of fall in water.
Figure 3:
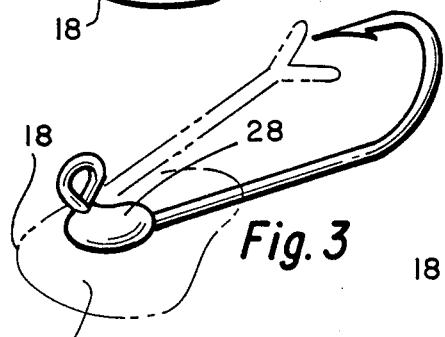
Figure 6:
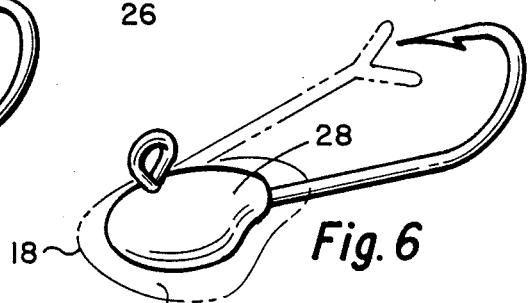
Figure 4:
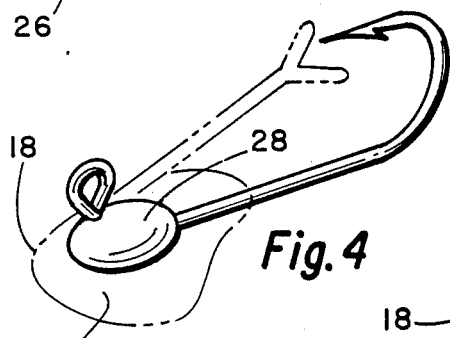
Figure 7:
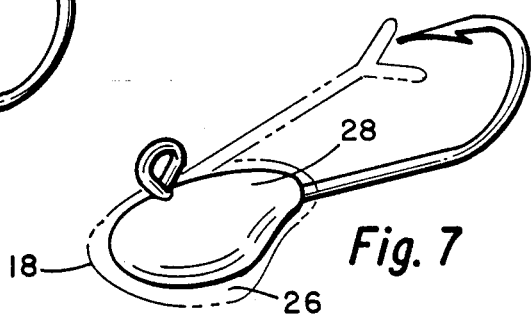

The slow falling jig according to the present invention, how it is made and used and how it differs from previously known jigs, as well as the advantages of its, use relative to the prior art jigs can perhaps be best explained and understood by reference to the drawings. FIG. 1 illustrates a typical jig according to the present invention (generally designated by the numeral 10). As illustrated, the jig 10 resembles a conventional lead head jig in that it comprises a barbed fishhook 12 having an eyelet 14 at one end and a barbed hook 16 at the other end. Directly behind the eyelet 14 is a head means 18 molded to the shank 20 of the hook 12 with a trailing skirt 22 following the head means 18 and partially covering the hook 12 (see FIG. 2 wherein the skirt 22 is deleted). In this particular illustrated embodiment, an optional snake tongue weedguard 24 is integrally molded with the head means 18 and as such, extends toward the barbed tip 16 of the hook 12 as generally known in the art. It should be generally appreciated and understood that various types of weedguards as well as spinner and the like, all as generally known in the fishing lure art, can be optionally employed in combination with the present invention provided their mass and drag are accounted for in establishing the desired overall slow rate of fall as further explained and exemplified later. As such, the presence of other elements in combination with the present jig fishing lure should be considered equivalent for purposes of this invention.

As illustrated in FIGS. 3 through 7, the jig according to the present invention differs from previously known jigs in that the head means 18 is manufactured with an outer layer of molded plastic 26 and an inner core 28 of metal. The quantity of each are preselected such as to achieve a reduction in the rate of fall for the overall lure during use under water relative to a conventional lead head jig. To further illustrate this concept, FIGS. 3 through 7 conform to the nominal size of the ½ ounce lead head jig (i.e., the size corresponding to ½ ounce of lead and not total lure weight). But, because of the varying amount of plastic 26 to center metal core 28, the without the 7" worm was essentially the same; however, the presence of the worm improved the distance of casting.

TABLE

| Total Weight Jig | Nominal Size of Mold | Type of Plastic | Metal Core | Size Hook | Weedless | Fall Rate 7" Plastic Worm | Fall Rate #11 Pork Rind |
|---|---|---|---|---|---|---|---|
| 1/32 oz | ½ oz | pp* | | 4/0** | Yes | 1 ft per 2.25 sec | 1 ft per 3.25 sec |
| ⅛ oz | ½ oz | pp | Lead | 4/0 | Yes | 1 ft per 1.75 sec | 1 ft per 2.25 sec |
| 3/16 oz | ½ oz | pp | Lead | 4/0 | Yes | 1 ft per 1.5 sec | 1 ft per 2.00 sec |
| ¼ oz | ½ oz | pp | Lead | 4/0 | Yes | 1 ft per 1.25 sec | 1 ft per 1.75 sec |
| ⅜ oz | ½ oz | pp | Lead | 4/0 | Yes | 1 ft per 1.0 sec | 1 ft per 1.5 sec |
| ½ oz | ½ oz | pp | Lead | 4/0 | Yes | 2 ft per sec | 1 ft per sec |

*General purpose polypropylene PRO-FAX
**EAgle Claw jig lures illustrated in FIGS. 3 through 7 correspond to ⅛, 3/16, ¼, ⅜ and ½ ounce jigs (total lure weight) according to the present invention, respectively.

Generally, the inner metal core can be fabricated from any convenient high density material. Preferably, lead is employed. The outer layer of plastic can generally be any relatively low density material, again as generally known in the art, which includes by way of example, but not limited thereto, any of the thermoplastics such as polyolefins, polyester, polyamides, polystyrenes, copolymers thereof and the like, as well as various thermosetting resins such as epoxies and the like. Preferably, a polyolefin such as polyethylene or polypropylene or a polyester is employed. During manufacturing, the lead is first molded to the shank of the fish hook directly adjacent to the eyelet and then the plastic is molded over the lead. The relative amounts of each component determines the ultimate overall rate of fall of the jig during use. Typically, a conventional nominal ⅜ or ½ ounce lead head jig size mold is employed to form the plastic head wherein the amount of lead used in the core in combination with the choice of plastic determines the rate of fall.

To further specifically exemplify this concept, a series of jigs characterized by a selected controlled rate of fall in water were manufactured according to that illustrated in the drawings. A nominal ½ ounce lead head jig mold (based on mass of lead present) was used for the 1/32, ⅛, 3/16, ¼, ⅜ and ½ ounce jig according to the present invention. A general purpose polypropylene available from Himont USA, Inc. of Wilmington, Del., sold under the name PRO-FAX and having a density of 0.903 gram/cm³ was used as the plastic outer layer. In the case of the 1/32 ounce jig (not shown), no lead insert was employed. In the case of the ½ ounce jig (FIG. 7), the plastic layer was approximately 0.062 inches thick. The relative amounts of plastic and lead for the other illustrated jigs were proportionally distributed between these limits. The following Table summarizes the data and performance of the resulting jigs made according to the present invention. The first column corresponds to the actual weight of the final lure including the hook, skirt, plastic head with lead insert and weedguard. The nominal size of the mold is expressed in equivalent ounces of lead. The fall rate was measured with a 7" plastic worm and a #11 pork rind attached to the hook as well as without anything attached. The rate of fall of the jig lure in water with or Because of the significant decrease in the rate of fall of the resulting jigs according to the present invention, the fisherman can more readily control the level at which the jigging is to be accomplished and more readily maintain a desired level of lure action during retrieval of the lure. This is accomplished basically by timing the fall of the lure after casting and timing the fall back after each jigging motion produced by the rod tip. For example, allowing approximately a 2 second fall back or pause for the 1/32, ⅛ and 3/16 ounce jigs will result in a near level or flat trajectory during retrieval of the jig. Similarly, a 1.5 to 1 second pause for the ¼, ⅜ and ½ ounce jigs will be sufficient to maintain level retrieval. In contrast, the 4 foot per second drop of the conventional lead head jig is very difficult to retrieve at a constant depth.

Experience also indicates that the fall rates of the jigs of the present invention are, for all practical purposes, independent of the tensile strength of the fishing line to be used. Thus, the jig lures are operable from 2 pound test all the way to 30 pound test line in that when the jig is used with a rubber worm or pork rind and a fishing line within this range, casting the lure is readily accomplished including casting up to 50 to 60 yards.

The jig lure according to the present invention can be decorated and finished by any of the techniques generally known in the art. If a transparent or metal flaked head is desired on the jig, a clear plastic such as poly(ethylene terephthalate) is preferred. Because the density of such plastics are higher than the olefins (e.g., 1.27 gms/cm³), the relative amount of lead core employed to achieve a given fall rate is reduced. Also, the lower limit of fall rate which can be achieved is correspondingly higher because of this increased density. For example, when employing poly(ethylene therephthalate) rather than the polypropylene exemplified in the above Table, the ⅛ ounce jig according to the present invention will be the lower limit fall rate in that no lead insert will be necessary. In other words, when using this higher density plastic, the jigs illustrated in FIGS. 3 through 7 will be one size heavier relative to the lighter density plastic. Of course, it should be appreciated that other nominal mold sizes other than the illustrated ½ ounce lead head jig size can be employed according to the present invention and similar density considerations are present for achieving the desired reduced rates of fall in water. As such, other sizes are to be considered equivalent for purposes of this invention.

Having thus described and exemplified the preferred embodiments with a certain degree of particularity, it is to be understood that the invention is not to be limited by the embodiments set forth herein for purposes of exemplification, but is to be limited only by the scope of the attached claims, including a full range of equivalents to which each element thereof is entitled.

I claim:

1. A jig fishing lure characterized by a controlled rate of descent in water comprising:
   (a) a fishing hook having an eyelet at one end of the shank and a barbed hook at the other end;
   (b) a head means molded of plastic attached to the shank directly behind the eyelet wherein said plastic molded head means contains a metal core of sufficient mass to achieve an overall rate of fall in water for the lure of from less than 2 feet per second to about 1 foot per 3.25 seconds; and
   (c) a skirt means attached to the shank and extending towards said barbed hook.

2. A jig fishing lure of claim 1 wherein said overall rate of fall is from about 1 foot per 2.25 seconds to about 1 foot per 3.25 seconds.

3. A jig fishing lure of claim 1 wherein said overall rate of fall is from about 1 foot per 1.75 seconds to about 1 foot per 2.25 seconds.

4. A jig fishing lure of claim 1 wherein said overall rate of fall is from about 1 foot per 1.50 seconds to about 1 foot per 2.00 seconds.

5. A jig fishing lure of claim 1 wherein said overall rate of fall is from about 1 foot per 1.25 seconds to about 1 foot per 1.75 seconds.

6. A jig fishing lure of claim 1 wherein said overall rate of fall is from about 1 foot per 1 second to about 1 foot per 1.50 seconds.

7. A jig fishing lure of claim 1 wherein said overall rate of fall is from less than 2 feet per second to about 1 foot per second.

8. A jig fishing lure of claim 1 wherein said head means is sized to correspond to the size of a ½ ounce lead head jig and said mass is about 1/32 ounce and wherein said rate of fall is about 1 foot per 2.25 seconds.

9. A jig fishing lure of claim 1 wherein said head means is sized to correspond to the size of a ½ ounce lead head jig and said mass is about ⅛ ounce and wherein said rate of fall is about 1 foot per 1.75 seconds.

10. A jig fishing lure of claim 1 wherein said head means is sized to correspond to the size of a ½ ounce lead head jig and said mass is about 3/16 ounce and wherein said rate of fall is about 1 foot per 1.50 seconds.

11. A jig fishing lure of claim 1 wherein said head means is sized to correspond to the size of a ½ ounce lead head jig and said mass is about ¼ ounce and wherein said rate of fall is about 1 foot per 1.25 seconds.

12. A jig fishing lure of claim 1 wherein said head means is sized to correspond to the size of a ½ ounce lead head jig and said mass is about ⅜ ounce and wherein said rate of fall is about 1 foot per 1.00 second.

* * * * *